United States Patent Office 3,432,516
Patented Mar. 11, 1969

3,432,516
PROCESS FOR THE STEREOSPECIFIC
POLYMERIZATION OF ISOPRENE
Walter Marconi and Alessandro Mzaaei, Milan, Marcello de Malde', San Donato Milanese, and Salvatore Cucinella, Milan, Italy, assignors to Snam Progetti S.p.A., Milan, Italy, a company of Italy
No Drawing. Continuation of application Ser. No. 169,621, Jan. 29, 1962. This application Sept. 8, 1966, Ser. No. 577,833
Claims priority, application Italy, Feb. 4, 1961, 1,984/61; Nov. 21, 1961, 18,075/61; Nov. 24, 1961, 18,193/61
U.S. Cl. 260—94.3
Int. Cl. C08d 1/14, 3/12

5 Claims

ABSTRACT OF THE DISCLOSURE

Essentially stereospecific polymers of isoprene of 1,4 configuration are produced by bringing isoprene into contact with a catalyst system consisting of a titanium tetrahalide and a co-catalyst represented by the formula $HAlX_2$ wherein each X is a halogen atom or an aminic radical bound to the aluminum through the nitrogen atom or a nitrogen-containing heterocyclic radical bound to the aluminum through the nitrogen atom.

---

This is a continuation of our pending application, Ser. No. 169,621, filed Jan. 29, 1962.

This invention relates to the production of stereospecific polymers of isoprene.

The production of those stereospecific polymers of isoprene which are synthetic elastomers is of considerable industrial interest. Particularly interesting is the preparation of those polymers which are substantially of 1,4-cis or 1,4-trans configuration or in which such configuration predominates. Various catalytic systems have been proposed for use in the preparation of cis-1,4 and trans-1,4 polyisoprene. As a rule binary catalyst systems are employed which consist of halides of the transition metals of Groups IV, V and VI of the Periodic Table according to Mendeleef and aluminum trialkyls, to which binary catalyst systems other auxiliary components may be added. In an alternative process there are employed catalysts based upon metallic lithium or an organic lithium compound, with or without salts of complex anions of boron, silicon, arsenic or heavy metals.

The object of the present invention is to provide a process for the preparation of polyisoprene of 1,4-configuration which is essentially stereospecific. We have discovered that isoprene can be polymerized under substantially anhydrous conditions in the presence of (a) a titanium tetrahalide and (b) a catalyst which is a substituted hydride having the general formula, $HAlX_2$, wherein each X is a member of the group consisting of halogen atoms, aminic radicals bound to aluminum through the nitrogen atom, and nitrogen-containing heterocyclic radicals bound to aluminum through the nitrogen atom, or a complex of such a substituted hydride with a member of the group consisting of ether, tetrahydrofurane and tertiary amine. The polyisoprene obtained through the use of our catalyst is of 1,4 configuration and is essentially stereospecific. This is surprising because a catalyst comprising an organometallic compound of the general formula $AlRX_2$, wherein R is a hydrocarbon, rather than hydrogen, is completely inoperative in the stereospecific polymerization of isoprene.

The catalyst system of the present invention has considerable advantages over those conventionally used, such as the less dangerous nature of the catalysts proposed when compared with the lithium and aluminum alkyls, and the fact that the polymer so obtained is almost completely soluble, is free from gel and easily purified.

A list of substances capable of forming addition compounds with aluminum may be found in a paper by Von G. Schomburg and R. G. Hoffman, Zeitschrift für die Elektrochemie, vol. 61, page 1110 (1957). In this specification, such addition compounds are hereinafter termed complex substituted hydrides. When using catalysts prepared from the two above defined components, it is possible to obtain polyisoprenes with a proportion of cis-1,4 structure exceeding 95%. But it is also possible to obtain a polymer in which the trans-1,4 configuration predominates. The kind of polymers obtained depends upon the molar ratio of the simple or complex substituted hydride to the titanium halide. Since the preferred metal from Groups II and III of the Periodic Table is aluminum, the molar ratio will be subsequently referred to as Al/Ti.

As a general rule, with low Al/Ti ratios, a polymer is obtained having a predominantly 1,4-trans structure. Upon increasing the ratio, there is obtained a polymer having substantially the 1,4-cis structure, and the yields of solid polymer increase. The percentage of cis 1,4-isomer in the solid polymer product remains constant or increases slightly as the ratio is further increased, but on the other hand the molecular weight of the polymer and the yield of the solid polymer diminish, so that there is no advantage in using exceedingly high ratios. When the catalyst system is formed by the use of a tetrahalide of titanium and a substituted hydride or a complex substituted hydride of aluminum and an ether using an Al/Ti ratio of from 0.25:1 to 1,4:1, a predominately 1,4-trans polymer is obtained. Upon increasing the Al/Ti ratio the polymer obtained rather suddenly changes to substantially wholly the 1,4-cis isomer. The optimum ratio is about 1.5 at which percentages of 1,4-cis polymer of 95% and more having average molecular weights of the order of 200,000 are obtainable. Ratios of Al to Ti up to 2 are readily useable though yields and molecular weights decrease. At even higher ratios these decreases become so marked as to make the course of polymerization unfavorable. The titanium halides which are suitable for carrying out the process of the invention are the tetrachloride, the tetrabromide and the tetraiodide.

The preparation of the simple and complex substituted hydrides is widely described in the literature.

The polymerization is carried out in an inert solvent, for instance, benzene or other aromatic hydrocarbon solvent such as toluene or the xylenes, at ordinary pressure. Any solvent for either or both components of the binary catalytic system is useful.

The reaction temperature may vary between −20° and +50° C., preferably between +10° C. and +30° C. The duration of the polymerization is normally some hours.

The two essential components of the catalytic system may be introduced separately into the reaction chamber in solution or one or both of them may be introduced in the undiluted state. Alternatively, the catalyst may be prepared separately, by mixing solutions of the two components or the two components in the pure state may be added to the solvent employed. The two components then react with one another to form a precipitate containing the titanium in a lesser degree of valency than the maximum. The preparation of the catalyst may be carried out at room temperature, or by heating. Preferably it is carried out at temperatures between 0° C. and 60° C. in the already mentioned solvents, in an atmosphere of an inert gas such as nitrogen or argon, and at atmospheric pressure.

By the polymerization there is obtained a polymer in the form of a gummy or powdery precipitate which is separated from the solvent by conventional methods.

The yield of solid polymer reported herein is the ratio by weight of the polymer coagulated with methyl alcohol to the total monomer fed, calculated as a percentage.

The following examples illustrate the nature of the invention:

EXAMPLES 1 TO 4

In these examples, to polymerize isoprene a catalyst system is employed which is formed from $$AlHCl_2 \cdot O(C_2H_5)_2$$

and titanium tetrachloride using various Al/Ti molar ratios.

Into a bottle of 200 ml. capacity, previously heated over a free flame and allowed to cool whilst passing a stream of nitrogen, there is introduced anhydrous benzene and the desired quantity of titanium tetrachloride. There is then introduced, whilst stirring, the desired quantity of aluminum dichlorohydride-diethyl ether complex. The bottle is sealed with a neoprene seal and a corona type bottle-cap punched in such a way as to expose a part of the neoprene seal.

The bottle is placed in a shaking machine for 10 minutes at room temperature to complete the reaction between the components of the catalyst. A very fine, brown precipitate is formed which can hardly be decanted.

Finally isoprene is introduced by means of a hypodermic syringe and immediately the bottle is placed in a thermostatic bath and rotated for the desired time. Subsequently the bottle is removed and its contents discharged into one liter of methyl alcohol containing 1% of an antioxidant. The precipitated polymer of gummy appearance, is removed and dried in an oven under vacuum at room temperature. The polymer yield is calculated. The polymer, in each case, is wholly soluble in toluene and the viscosity of such solution is determined in order to calculate the average molecular weight.

The conditions of polymerization and the results of infra-red analyses are reported in the following table:

Anhydrous benzene 100 ml.;
Titanium tetrachloride 2.27 millimoles;
$AlHI_2 \cdot O(C_2H_5)_2$ 3.4 millimoles; and
Isoprene 21 g.
Molar ratio Al/Ti=1.5.

The polymerization is carried out at +5° C. for 15 hours.

The yield of solid gummy polymer is 40%.

The infra-red analysis gives the following composition: 81% 1-4 cis; 9% 1-4 trans; 10% 3-4; and 0.2% 1-2. Total unsaturation: 87%.

A further advantageous aspect of the invention is constituted by the use of the substituted hydrides of aluminum complexed with tertiary amines, as co-catalysts: the tertiary amines in question are preferably aliphatic amines or cyclo-aliphatic amines. Compounds of that kind are, for instance, $AlHCl_2 \cdot N(CH_3)_3$ and analogous compounds. The preparation of those compounds generally is easy and it is described in literature (see, for instance, J. K. Ruff, J.A.C.S. 83, page 1798 (1961)).

In connection with this particular aspect of the invention, titanium tetrachloride is particularly suitable.

As already mentioned, the polymerization is carried out in hydrocarbon solvent: it is preferable to select, from the hydrocarbon solvents, those capable of dissolving both the components of the catalyst system. The reaction temperature may vary between −20° C. and +50° C., preferably between +10° C. and +30° C. The polymerization lasts some hours. The two components of the catalyst system may be introduced separately or in solution into the reaction room; it is also possible to mix the solutions of the two components or even to introduce the two components in the pure state with the solvent and so they react to form a precipitate containing the titanium at a valency lower than its maximum valency. The catalyst may be prepared at room temperature or at a higher temperature, temperatures of from 0° C. to 60° C. being

TABLE 1

| Ex. No. | $AlHCl_2 \cdot O(C_2H_5)_2$ millimoles | $TiCl_4$, millimoles | Molar ratio Al/Ti | Solvent (Benzene), cm.³ | Isoprene, gr. | T., °C. | Duration, hours | Yield, Percent | Infra-red Analysis, Percent | | | | Unsat. Total, Percent | Mol. weight in toluene at 30° C. |
|---|---|---|---|---|---|---|---|---|---|---|---|---|---|---|
| | | | | | | | | | 1,4 cis | 1,4 trans | 1,2 | 3,4 | | |
| 1 | 2.73 | 1.82 | 1.5 | 100 | 21 | 10 | 16 | 55 | 95.7 | 0.1 | 0.4 | 3.8 | 91 | 209,600 |
| 2 | 2.91 | 1.82 | 1.6 | 100 | 21 | 10 | 16 | 75 | 95.7 | 0.0 | 0.3 | 3.9 | 92 | 186,000 |
| 3 | 3.28 | 1.82 | 1.8 | 100 | 21 | 10 | 16 | 40 | 95.8 | 0.0 | 0.3 | 3.9 | 86 | 119,900 |
| 4 | 3.64 | 1.82 | 2.0 | 100 | 21 | 10 | 16 | 15 | 94.0 | 2.0 | 0.4 | 4.0 | 92 | 80,060 |

EXAMPLE 5

Isoprene is polymerized by the procedure described in the preceding examples, using the following recipe:

Anhydrous benzene 100 ml.;
Titanium tetrachloride 3.92 millimoles;
$AlHCl_2 \cdot O(C_2H_5)_2$ 1.96 millimoles; and
Isoprene 21 g.
Molar ratio Al/Ti=0.5.

The polymerization is carried out at +10° C. for 16 hours. The yield of solid, white, powdery polymer is 14%. The polymer is insoluble in benzene and in carbon sulphide. Infra-red analysis shows that it is substantially wholly 1,4-trans polyisoprene.

EXAMPLE 6

This is carried out in the same way as the preceding examples, but aluminum di-iodohydride-diethyl ether complex $(AlHI_2 \cdot O(C_2H_5)_2)$ is used in lieu of aluminum dichlorohydride-diethyl ether complex. The quantities used are as follows:

generally suitable, in the hydrocarbon solvents already mentioned, in an atmosphere of inert gas and at atmospheric pressure. The polymerization yields a polymer that can assume the shape of a gummy precipitate or sometimes powdery; it is liberated from the solvent by the conventional methods. In the examples reported hereinafter, the expression yield of solid polymer is intended to indicate the ratio by weight of the polymer apt to be coagulated by methyl alcohol, to total monomer fed, referred to as 100.

EXAMPLES 7–12

In these examples is described the polymerization of isoprene with a catalyst system formed of $$AlHCl_2 \cdot N(CH_3)_3$$

and $TiCl_4$.

The method followed in the preparation of the catalyst is analogous to that employed in the preceding examples. The conditions of polymerization and the results obtained are tabulated here below in Table 2.

TABLE 2

| Example Number | $AlHCl_2N(CH_3)_3$ millimoles | $TiCl_4$, millimoles | Molar ratio Al/Ti | Solvent (Benzene), cm.³ | Isoprene, gr. | T. °C. | Duration, hours | Yield, percent | Infra-red analysis, percent | | | | Unsat. Total |
|---|---|---|---|---|---|---|---|---|---|---|---|---|---|
| | | | | | | | | | 1,4 cis | 1,4 trans | 1,2 | 3,4 | |
| 7 | 2.37 | 1.82 | 1.3 | 100 | 20.4 | +15 | 16 | 5.4 | Predominantly 1,4 trans | | | | (¹) |
| 8 | 2.74 | 1.82 | 1.5 | 100 | 20.4 | +15 | 18 | 86 | 95.7 | 0 | 0.4 | 3.9 | 88 |
| 9 | 2.91 | 1.82 | 1.6 | 100 | 20.4 | +15 | 16 | 90.5 | 95.5 | 0 | 0.5 | 4 | 82 |
| 10 | 3.1 | 1.82 | 1.7 | 100 | 20.4 | +15 | 16 | 56.5 | 05.5 | 0 | 0.3 | 3.8 | 87 |
| 11 | 3.28 | 1.82 | 1.8 | 100 | 20.4 | +15 | 16 | 55.5 | 94.5 | 1.1 | 0.4 | 4 | 84 |
| 12 | 3.46 | 1.82 | 1.9 | 100 | 20.4 | +15 | 16 | 19.3 | 90.5 | 3.4 | 0.6 | 5.5 | 85 |

¹ Molecular weight in toluene at +30° C.=6.22.10⁵.

The practical development of the present invention has permitted to find a further class of compounds that are very useful as co-catalysts, together with the titanium halides already previously described, in the stereospecific polymerization of isoprene. These compounds, which are called amino-alanes and halo-amino-alanes, have the general formula HAlX$_2$, where each X represents a secondary aminic radical (—NR′R″) and wherein the nitrogen atom may be bonded to alkyl, aryl, alkyl-aryl or cycloalkyl radicals, equal to or different from one another, or may form part of a heterocyclic ring. Examples of such compounds are:

(CH$_3$)$_2$NAlHBr, (C$_2$H$_5$)$_2$NAlHCl, (CH$_3$) (C$_2$H$_5$)NAlHI

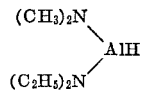

Said compounds are generally easy to be prepared and some of them are described in literature (J. K. Ruff, J.A.C.S., 83, 535 and 2835 (1961)) while or homologs have been prepared by the methods described in the cited article. The considerations made regarding the Al/Ti molar ratio may be repeated also for the catalyst systems now taken into particular consideration; the same should be said for the hydrocarbon solvents as well as for the reaction temperatures, the preparation of the catalyst and in general for all the other parameters which are of interest for the carrying out of the process in practice.

What is claimed is:

1. A process for the stereospecific polymerization of isoprene consisting in bringing the isoprene into contact with a catalyst which is a titanium tetrahalide and a co-catalyst having the general formula HAlX$_2$ wherein each X is a member of the group consisting of halogen atoms, aminic radicals bound to aluminum through the nitrogen atom, and nitrogen-containing heterocyclic radicals bound to aluminum through the nitrogen atom.

2. The process according to claim 1, wherein the co-catalyst is complexed with a molecule selected from the group consisting of an ether, tetrahydrofurane and a tertiary amine.

3. The process according to claim 1, wherein titanium tetrachloride is used as the titanium halide.

4. The process according to claim 1, wherein the co-catalyst is selected from the group consisting of AlHCl$_2$·O(C$_2$H$_5$)$_2$, AlHI$_2$·O(C$_2$H$_5$)$_2$, and AlHCl$_2$·N(CH$_3$)$_3$.

5. The process according to claim 1, wherein the co-catalyst is selected from the group consisting of AlHBrN(CH$_3$)$_2$ and AlHClN(C$_6$H$_5$)$_2$.

References Cited

UNITED STATES PATENTS

| | | | |
|---|---|---|---|
| 2,882,264 | 4/1959 | Barnes et al. | 260—94.9 |
| 3,165,503 | 1/1965 | Kahn et al. | 260—94.3 |
| 3,311,604 | 1/1967 | Marconi et al. | 260—94.3 |

JOSEPH L. SCHOFER, *Primary Examiner.*

R. A. GAITHER, *Assistant Examiner.*

U.S. Cl. X.R.

260—94.6